(12) United States Patent
Park et al.

(10) Patent No.: US 12,452,560 B2
(45) Date of Patent: Oct. 21, 2025

(54) IMAGE SENSOR INCLUDING ANALOG-TO-DIGITAL CONVERTER AND RAMP VOLTAGE GENERATOR

(71) Applicant: SK hynix Inc., Icheon-si (KR)

(72) Inventors: Yu Jin Park, Icheon-si (KR); Soo Hwan Kim, Icheon-si (KR); Min Kyu Kim, Icheon-si (KR); Kang Bong Seo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 286 days.

(21) Appl. No.: 18/340,673

(22) Filed: Jun. 23, 2023

(65) Prior Publication Data

US 2024/0214705 A1    Jun. 27, 2024

(30) Foreign Application Priority Data

Dec. 21, 2022 (KR) .................. 10-2022-0180922

(51) Int. Cl.
*H04N 25/772* (2023.01)
*H04N 25/59* (2023.01)
*H04N 25/71* (2023.01)

(52) U.S. Cl.
CPC .......... *H04N 25/772* (2023.01); *H04N 25/59* (2023.01); *H04N 25/745* (2023.01)

(58) Field of Classification Search
CPC .... H04N 25/772; H04N 25/59; H04N 25/745; H04N 25/75; H04N 25/575; H04N 25/51; H04N 25/616; H04N 25/67; H04N 25/58; H04N 25/709; H04N 25/78

See application file for complete search history.

(56) References Cited

U.S. PATENT DOCUMENTS

| | | | |
|---|---|---|---|
| 9,374,070 B2 * | 6/2016 | Higuchi | H03K 4/08 |
| 10,389,956 B2 * | 8/2019 | Kim | H04N 25/78 |
| 10,615,190 B2 * | 4/2020 | Ebihara | H04N 25/78 |
| 11,070,761 B2 | 7/2021 | Okura | |
| 11,343,449 B2 * | 5/2022 | Paik | H04N 25/59 |
| 2019/0222780 A1 * | 7/2019 | Chang | H04N 25/59 |
| 2023/0164456 A1 * | 5/2023 | Jun | H04N 25/616 |
| | | | 348/207.99 |

FOREIGN PATENT DOCUMENTS

| | | |
|---|---|---|
| CN | 111385499 A | 7/2020 |
| KR | 1020210102517 A | 8/2021 |
| KR | 1020220023601 A | 3/2022 |

* cited by examiner

*Primary Examiner* — Nhan T Tran
(74) *Attorney, Agent, or Firm* — WILLIAM PARK AND ASSOCIATES LTD.

(57) ABSTRACT

According to the present disclosure, an image sensor includes a pixel including a floating diffusion (FD) node having a first capacitance in a first mode and a second capacitance that is less than the first capacitance in a second mode, an analog-to-digital converter (ADC) outputting a pixel value based on a ramp voltage and a pixel voltage output from the pixel, and a ramp voltage generator controlling the ramp voltage based on a difference between a first pixel value output from the ADC in the first mode and a second pixel value output from the ADC in the second mode.

18 Claims, 8 Drawing Sheets

IMAGE SENSOR INCLUDING ANALOG-TO-DIGITAL CONVERTER AND RAMP VOLTAGE GENERATOR

CROSS-REFERENCE TO RELATED APPLICATION

The present application claims priority under 35 U.S.C. § 119(a) to Korean patent application number 10-2022-0180922 filed on Dec. 21, 2022, in the Korean Intellectual Property Office, the entire disclosure of which is incorporated by reference herein.

BACKGROUND

1. Technical Field

Various embodiments of the present disclosure relate to an analog-to-digital converter (ADC) and a ramp voltage generator that are included in an image sensor.

2. Related Art

The dynamic range (DR) of a digital image is defined as a ratio between the brightest pixel value and the darkest pixel value within the image. An image having a wider DR than a typical DR that is generally covered by an electronic device is referred to as a high dynamic range (HDR) image. Various techniques are used for generating HDR images. For example, a method of taking a plurality of images during different exposure times and combining the taken images, and a method of combining images created from a single exposure of each pixel and at least two readouts with different conversion gains may be performed. For example, an image sensor may obtain an HDR image by continuously reading out charges generated by a single exposure of a pixel in a high conversion gain (HCG) mode and a low conversion gain (LCG) mode. The conversion gain may refer to a ratio at which charges accumulated in floating diffusion (FD) of each pixel are converted into a voltage.

However, when an image sensor that uses dual conversion gain (DCG) changes the conversion gain of a pixel, coupling capacitance of a floating diffusion (FD) node may be changed. As a result, a level of a pixel voltage that is output by the corresponding pixel may be changed accordingly. For example, when the image sensor changes the conversion gain of the pixel from LCG to HCG, a pixel voltage that is output by the pixel may be reduced by tens to hundreds mV. Therefore, accuracy of correlated double sampling (CDS) that is carried out by the image sensor may be deteriorated, and noise, such as column fixed pattern noise (CFPN), may be included in the HDR image acquired by the image sensor.

SUMMARY

According to an embodiment, an image sensor may include a pixel including a floating diffusion (FD) node having a first capacitance in a first mode and a second capacitance that is less than the first capacitance in a second mode, an analog-to-digital converter (ADC) outputting a pixel value based on a ramp voltage and a pixel voltage output from the pixel, and a ramp voltage generator controlling the ramp voltage based on a difference between a first pixel value output from the ADC in the first mode and a second pixel value output from the ADC in the second mode.

According to an embodiment, a method of operating an image sensor may include obtaining a first pixel value by comparing a first pixel voltage output from a first pixel with a ramp voltage, obtaining a second pixel value by comparing the ramp voltage with a second pixel voltage output from the first pixel having a conversion gain changed by switching, controlling the ramp voltage based on a difference between the first pixel value and the second pixel value, and obtaining a third pixel value by comparing a third pixel voltage output from a second pixel with a controlled ramp voltage.

DETAILED DESCRIPTION

Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Hereinafter, exemplary embodiments of the present disclosure will be described in detail with reference to the accompanying drawings in order for those skilled in the art to be able to readily implement the technical spirit of the present disclosure. Specific structural or functional descriptions of examples of embodiments in accordance with concepts which are disclosed in this specification are illustrated only to describe the examples of embodiments in accordance with the concepts and the examples of embodiments in accordance with the concepts may be carried out by various forms but the descriptions are not limited to the examples of embodiments described in this specification.

Figure 1:
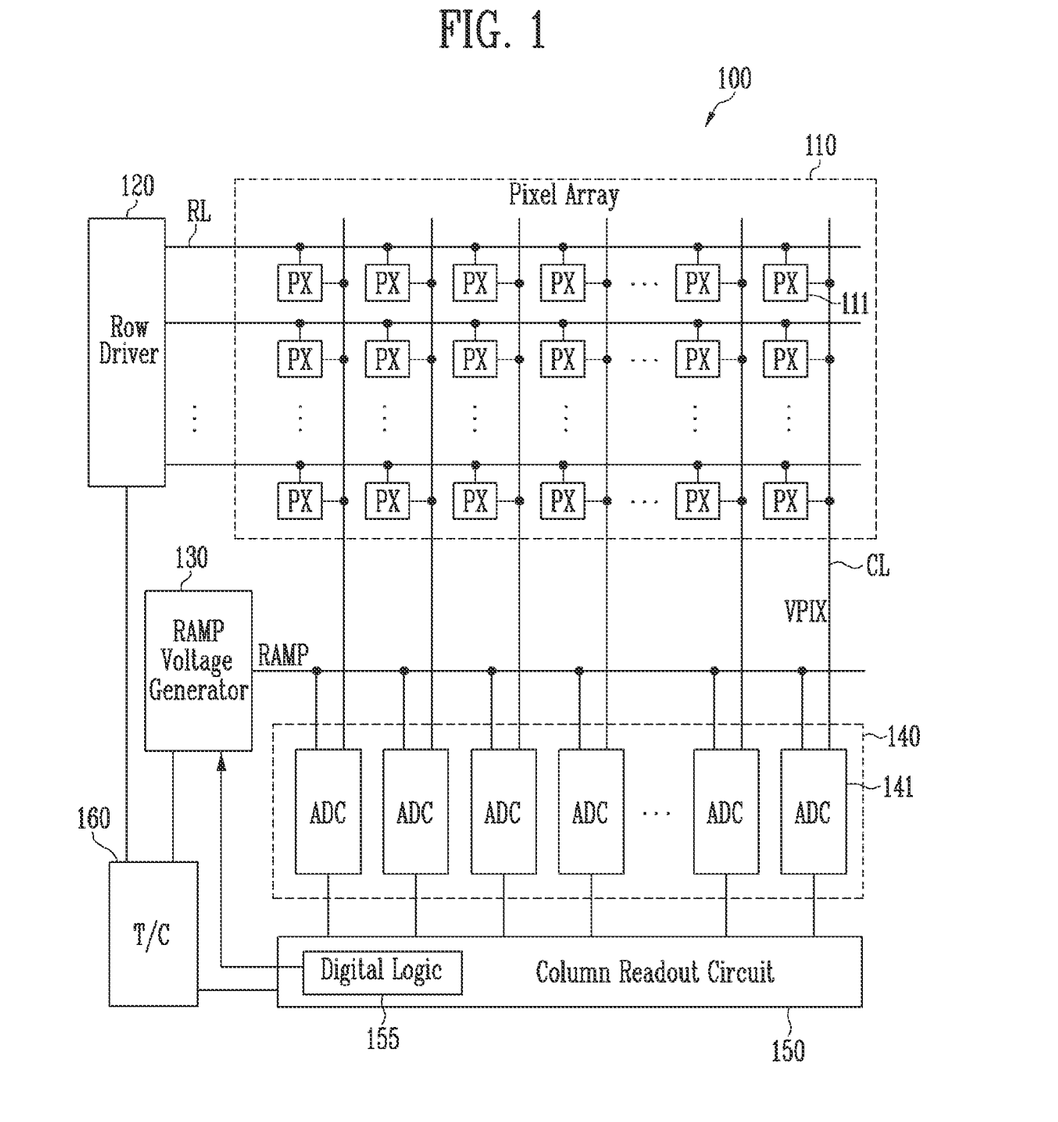
FIG. 1 is a diagram illustrating the configuration of an image sensor according to an embodiment of the present disclosure.

FIG. 1 is a diagram illustrating the configuration of an image sensor 100 according to an embodiment of the present disclosure.

Referring to FIG. 1, the image sensor 100 may include a pixel array 110, a row driver 120, a ramp voltage generator 130, an analog-to-digital converter (ADC) block 140, a column readout circuit 150, and a timing controlling (T/C) 160. However, these components, shown in FIG. 1, are merely examples. The image sensor 100 may further include additional components that are not shown in FIG. 1.

The pixel array 110 may include a plurality of row lines RL, a plurality of column lines CL, and a plurality of pixels PX that are arranged along the plurality of row lines RL and the plurality of column lines CL. The structure of the pixels PX will be described below with reference to FIGS. 2A and 2B.

According to the present disclosure, the pixels PX may have dual conversion gain (hereinafter, "DCG"). In other words, the pixels PX that are included in the pixel array 110 may operate according to a Dual Conversion Gain (DCG) method. For example, each of the pixels PX may operate in both a low conversion gain (LCG) mode or in a high conversion gain (HCG) mode. The conversion gain may refer to a ratio at which charges accumulated in a floating diffusion (FD) node included in each pixel PX are converted into a voltage. The pixel PX may have a lower conversion gain (LCG) as the magnitude of the capacitance of the FD node decreases. On the other hand, the pixel PX may have a higher conversion gain (HCG) as the magnitude of the FD node increases.

The image sensor 100 may continuously operate in an LCG mode and an HCG mode during a readout period subsequent to a single exposure of the pixel PX. As a result, the image sensor 100 may acquire first image data according to an LCG mode and second image data according to an HCG mode in one frame period. The image sensor 100 may provide the first image data and the second image data to an image processor (not shown). The image processor may generate a high dynamic range (HDR) image by integrating the first image data and the second image data.

For example, the first image data acquired as the pixels PX operate in the LCG mode may correspond to a relatively dark image. In addition, the second image data acquired as the pixels PX operate in the HCG mode may be a relatively bright image. Therefore, a bright area may be clearly represented in the first image data, and a dark area may be clearly represented in the second image data. The image processor may generate an HDR image having wider DR than each of the first and second image data by combining the bright area of the first image data and the dark area of the second image data. In the specification, by way of an example, features and aspects of the disclosure are described in the context in which the image sensor 100 acquires the first image data and the second image data by using the pixels PX whose conversion gain is adjustable.

The row driver 120 may select at least one row, among a plurality of rows included in the pixel array 110, in response to the control of the timing controller 160. The row driver 120 may control the pixels PX included in a predetermined row to output a pixel voltage VPIX through the row line RL. The image sensor 100 may read out the pixels PX included in the predetermined row, among the plurality of pixels PX included in the pixel array 110, upon selection of the row driver 120.

The row driver 120 may determine the LCG mode or the HCG mode as a driving mode of the pixel PX. The row driver 120 may control the conversion gain of the pixel PX by controlling the capacitance of the FD node included in the pixel PX. The driving mode of the pixel PX by controlling the capacitance of the FD node will be described below with reference to FIG. 2A.

The ramp voltage generator 130 may output a ramp voltage RAMP by controlling the timing controller 160. The ramp voltage generator 130 may provide the ramp voltage RAMP to each of the ADCs included in the ADC block 140. The ramp voltage generator 130 may control a potential of the ramp voltage RAMP through a feedback system (e.g., a feedback loop) with the ADC block 140 and digital logic 155. The potential of the ramp voltage RAMP is described below with reference to FIG. 3.

The ADC block 140 may include a plurality of ADCs. The ADCs included in the ADC block 140 may respectively correspond to columns of the pixels PX included in the pixel array 110. For example, the ADC block 140 may include as many ADCs as the number of columns of the pixels PX included in the pixel array 110. Referring to FIG. 1, a first ADC 141 may be coupled to the pixels PX of a first column that includes a first pixel 111 through the column line CL.

The ADC may convert the pixel voltage VPIX that is input from the pixel PX into a pixel value that is a digital signal. Each of the ADCs included in the ADC block 140 may include a comparator and a counter. The ADC may convert the pixel voltage VPIX that is an analog signal into a pixel value that is a digital signal by using the comparator and the counter.

For example, the comparator may compare the pixel voltage VPIX received from the pixel PX through the column line CL with the ramp voltage RAMP received from the ramp voltage generator 130. The comparator may output a comparison signal corresponding to a comparison result between the pixel voltage VPIX and the ramp voltage RAMP. The counter may obtain a pixel value based on a time at which the comparison signal is inverted. Operations of the comparator and the counter included in the ADC will be described below in detail with reference to FIG. 5.

In the present disclosure, ADCs may perform analog-to-digital conversion (ADC) regardless of a conversion gain of the pixels PX. In other words, the first ADC 141 may output a first pixel value based on the first pixel voltage that is output by the first pixel 111 in the LCG mode and may output a second pixel value based on a second pixel voltage that is output by the first pixel 111 in the HCG mode.

The column readout circuit 150 may output pixel values that are output from the ADC block 140 to the outside of the image sensor 100. For example, the column readout circuit 150 may receive the pixel values from the ADCs and output image data (e.g., first image data and second image data) including the pixel values to an image processor (not shown).

The column readout circuit 150 may include the digital logic 155. The digital logic 155 may calculate a difference between pixel values acquired according to the conversion gain of the pixels PX. For example, the digital logic 155 may generate difference value data by calculating a difference between the first pixel value that is output by the first ADC 141 in the LCG mode and the second pixel value that is output by the first ADC 141 in the HCG mode. The digital logic 155 may provide the difference value data to the ramp voltage generator 130. Operations of the digital logic 155 and the ramp voltage generator 130 will be described below in more detail with reference to FIG. 4.

The timing controller 160 may output a control signal to each of the row driver 120, the ramp voltage generator 130, and the column readout circuit 150. The timing controller 160 may control the timings at which the row driver 120, the ramp voltage generator 130, and the column readout circuit 150 operate by using the control signal.

Figure 2A:
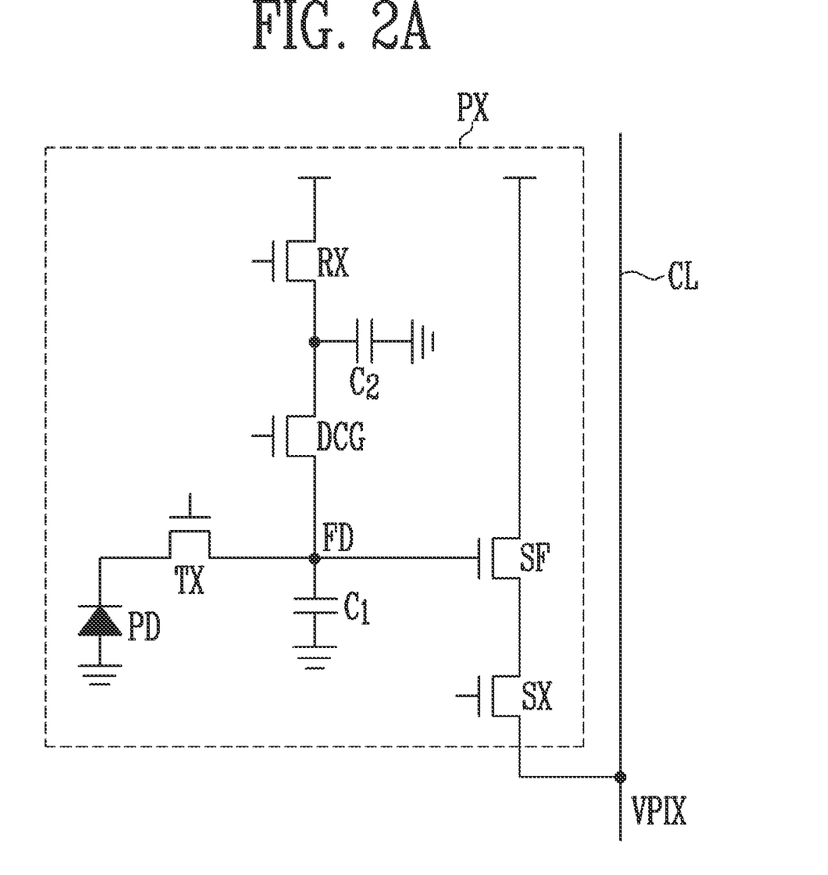
FIG. 2A is a diagram illustrating an example of a pixel supporting dual conversion gain (DCG) technology according to an embodiment of the present disclosure.

FIG. 2A is a diagram illustrating an example of the pixel PX supporting dual conversion gain (DCG) technology according to an embodiment of the present disclosure.

Referring to FIG. 2A, the pixel PX may include a photodiode PD, a transmission transistor TX, a floating diffusion (FD) node FD, a source follower SF, a select transistor SX, a reset transistor RX, a first capacitor $C_1$, a second capacitor $C_2$, and a dual conversion gain (DCG) transistor DCG.

The photodiode PD may convert light incident on the pixel PX from the outside into an electric signal. The photodiode PD may generate charges corresponding to the incident light. For example, the photodiode PD may generate a larger amount of charges as the incident light has a greater intensity.

The charges accumulated in the photodiode PD during exposure time may be moved to the FD node FD when the transmission transistor TX is in an ON state. The charges generated by the photodiode PD may be accumulated in the FD node FD through the transmission transistor TX. When the DCG transistor DCG is in an OFF state, the charges may be accumulated in the first capacitor $C_1$. When the DCG transistor DCG is in an ON state, the charges may be accumulated in the first capacitor $C_1$ and the second capacitor $C_2$.

The charges accumulated in the FD node FD may generate a voltage. In other words, the charges accumulated in the FD node FD may be converted into a voltage. The source follower SF may output a voltage corresponding to the voltage of the FD node FD as the pixel voltage VPIX.

The select transistor SX may select the pixel PX. The row driver 120 of FIG. 1 may provide the pixel voltage VPIX of the selected pixel PX to the ADC through the column line CL by turning on the select transistor SX of the pixel PX.

The reset transistor RX may reset the FD node FD. The row driver 120 may reset the FD node FD, the first capacitor $C_1$, and the second capacitor $C_2$ of the corresponding pixel PX by turning on the reset transistor RX of the pixel PX.

The DCG transistor DCG may control the conversion gain of the pixel PX by controlling the capacitance of the FD node FD in response to the control of the row driver 120. When DCG transistor DCG is in an OFF state, the FD node FD may be coupled to the first capacitor $C_1$, and the FD node FD may have a capacitance based on the first capacitor $C_1$. When the DCG transistor DCG is in the ON state, the FD node FD may be coupled to the first capacitor $C_1$ and the second capacitor $C_2$, and the FD node FD may have a capacitance based on the first capacitor $C_1$ and the second capacitor $C_2$. The conversion gain of the pixel PX may be inversely proportional to the capacitance of the FD node FD. Thus, when the DCG transistor DCG is in an ON state, the pixel PX may have a low conversion gain (LCG). On the other hand, when the DCG transistor DCG is in an OFF state, the pixel PX may have a high conversion gain HCG. In the present disclosure, the DCG transistor DCG may be referred to as a switch included in the pixel PX.

The row driver 120 may determine a driving mode of the pixel PX by using ON/OFF of the DCG transistor DCG. In the present disclosure, the driving mode in which the DCG transistor DCG included in the pixel PX is in the ON state and the pixel PX has a low conversion gain LCG may be referred to as a first mode (an LCG mode), and the driving mode in which the DCG transistor DCG included in the pixel PX is in the OFF state and the pixel PX has the high conversion gain HCG may be referred to as a second mode (an HCG mode).

Figure 2B:
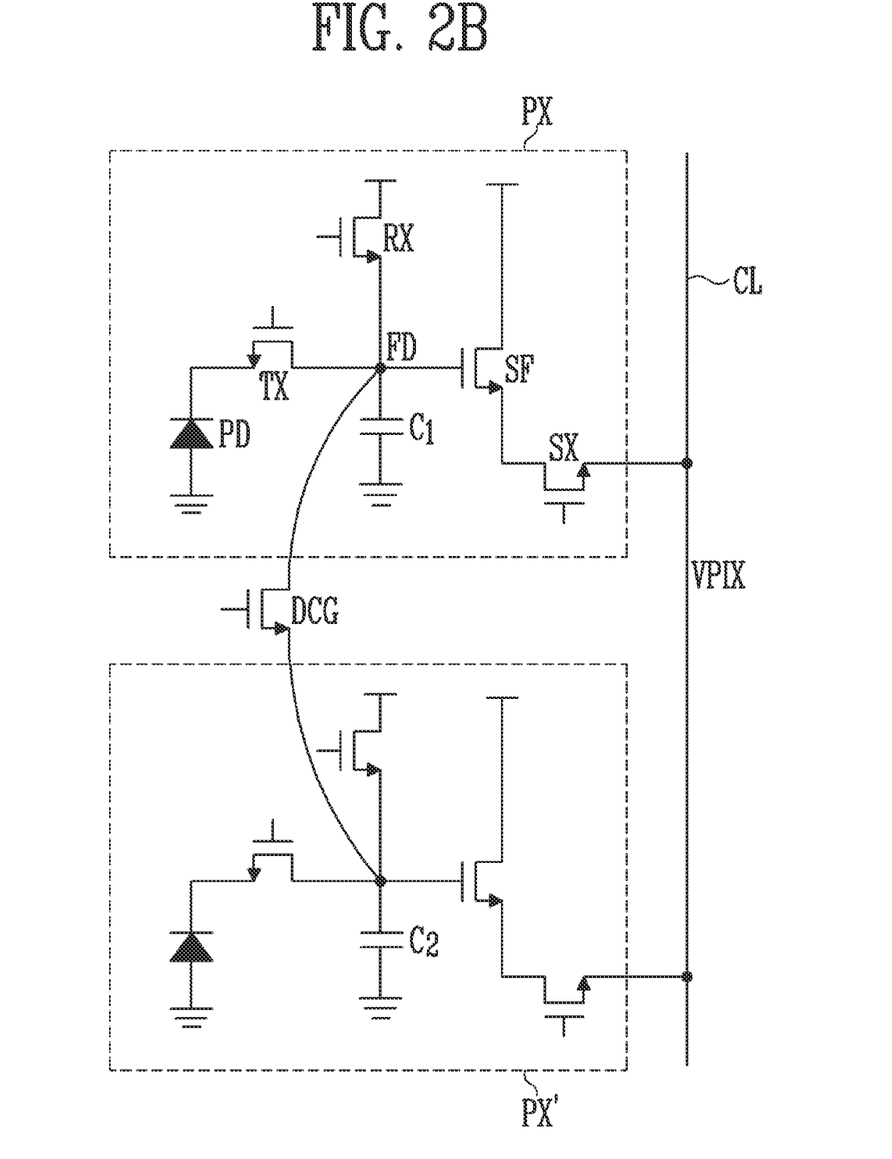
FIG. 2B is a diagram illustrating another example of a pixel supporting DCG technology according to an embodiment of the present disclosure.

FIG. 2B is a diagram illustrating another example of a pixel supporting DCG technology according to an embodiment of the present disclosure. A description of components that are the same as described above with reference to FIG. 2A will be omitted.

Referring to FIG. 2B, the pixel PX may include the photodiode PD, the transmission transistor TX, the floating diffusion (FD) node FD, the source follower SF, the select transistor SX, the reset transistor RX, and the first capacitor $C_1$.

When FIGS. 2A and 2B are compared against each other, the pixel PX of FIG. 2A may include two capacitors (e.g., the first capacitor $C_1$ and the second capacitor $C_2$), whereas the pixel PX of FIG. 2B may include one capacitor (e.g., the first capacitor $C_1$). Referring to FIG. 2B, the FD node FD may be coupled to the first capacitor $C_1$ of the pixel PX and the second capacitor $C_2$ of another pixel PX'. For example, when the DCG transistor DCG is in an OFF state, the FD node FD may be coupled to the first capacitor $C_1$, and when the DCG transistor DCG is in an ON state, the FD node FD may be coupled to the first capacitor $C_1$ of the pixel PX and the second capacitor $C_2$ of another pixel PX'.

In other words, according to the present disclosure, the image sensor 100 may control the conversion gain by using two capacitors included in each pixel PX as shown in FIG. 2A, or the image sensor 100 may control the conversion gain by using two capacitors, each capacitor included in different pixels (PX and PX') as shown in FIG. 2B.

In addition, in FIGS. 2A and 2B, the image sensor 100 may control the capacitance of the FD node FD by using two capacitors that may be coupled to the FD node FD. However, this is merely an example, and the present disclosure is not limited thereto. For example, the image sensor 100 may be configured in such a manner that one capacitor is coupled to the FD node FD of each pixel PX, the FD node FD is coupled to the one capacitor in the first mode (LCG), and the FD node FD is not coupled to the one capacitor in the second mode (HCG).

Figure 3:
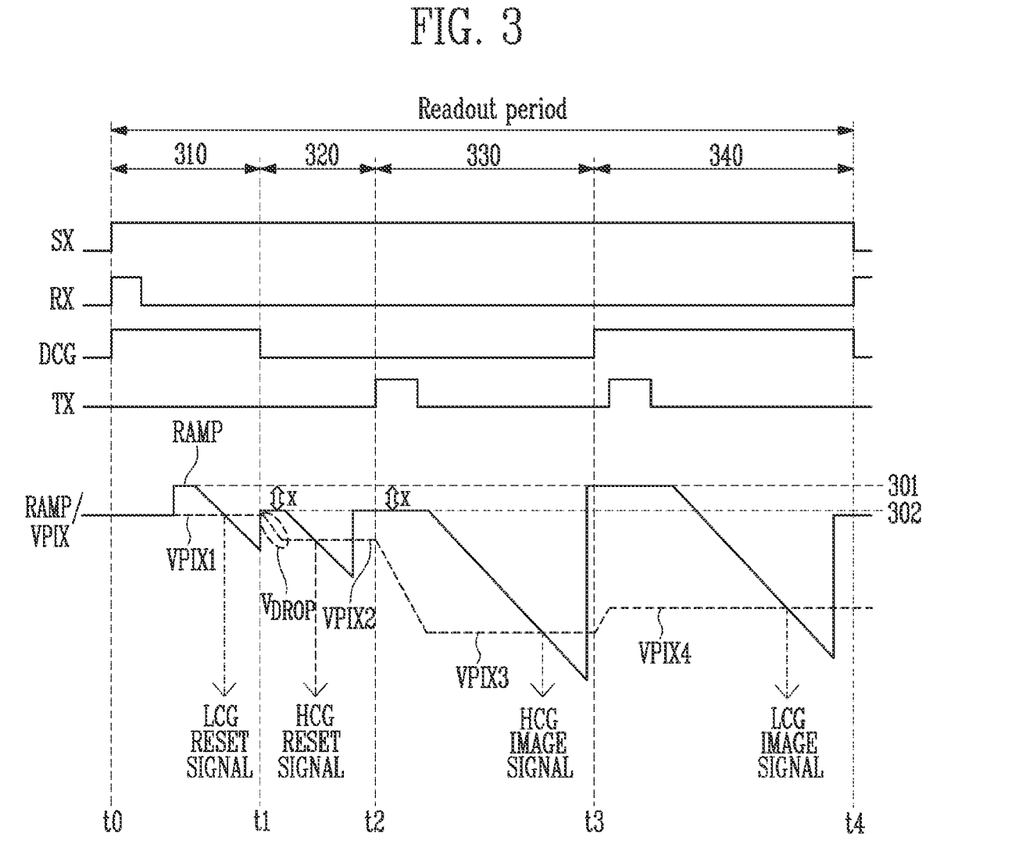
FIG. 3 is a timing diagram illustrating an image sensor using a controlled ramp voltage according to an embodiment of the present disclosure.

FIG. 3 is a timing diagram illustrating the image sensor 100 using a controlled ramp voltage according to an embodiment of the present disclosure.

The image sensor 100 may perform correlated double sampling (CDS) so as to reduce noise (e.g., reset noise) caused by inherent pixel characteristics and/or noise (e.g., column fixed pattern noise (CFPN)) caused by characteristics of logic (e.g., the column line CL, the ADC, and the like) that outputs the pixel voltage VPIX. The image sensor 100 may read out a reset signal of the corresponding pixel PX and an image signal associated with the reset signal during a readout period of the pixel PX. The image sensor 100 may obtain a pixel value corresponding to the actual image signal, i.e., pixel data that indicates the amount of charges generated by the photodiode PD of the pixel PX by subtracting the reset signal from the image signal of the pixel PX.

When the pixel PX supports DCG technology, the image sensor 100 may read out a reset signal and an image signal with respect to each of the LCG mode and the HCG mode during a readout period. For example, the image sensor 100 may obtain LCG pixel data based on an LCG reset signal and an LCG image signal and may obtain HCG pixel data based on an HCG reset signal and an HCG image signal of the pixel PX.

Referring to FIG. 3, the readout period of the pixel PX may be divided into four sub-periods. For example, the image sensor 100 may obtain the LCG reset signal of the pixel PX during a first period 310, the HCG reset signal of the pixel PX during a second period 320, the HCG image signal of the pixel PX during a third period 330, and the LCG image signal of the pixel PX during a fourth period 340. The pixel PX may operate in the LCG mode during the first period 310 and the fourth period 340, and the pixel PX may operate in the HCG mode during the second period 320 and the third period 330. As shown in FIG. 3, the LCG reset signal, the HCG reset signal, the HCG image signal, and the LCG image signal may be sequentially read out during the readout period of the pixel PX, which may be referred to as a reset-reset-signal-signal (RRSS) readout method.

Reference characters SX, RX, DCG, and TX as shown in FIG. 3 may show ON/OFF states of the select transistor SX, the reset transistor RX, the DCG transistor DCG, and the transmission transistor TX, respectively, as shown in FIGS. 2A and 2B.

The select transistor SX may be in an ON state during the readout period. The image sensor 100 (e.g., the row driver 120) may turn on the select transistor SX at time to when the readout period of the pixel PX starts and may turn off the select transistor SX at time t4 when the readout period of the pixel PX ends.

The image sensor 100 may turn on the reset transistor RX and the DCG transistor DCG of the pixel PX at time to when the first period 310 starts. The image sensor 100 may reset the FD node FD of the pixel PX by turning on the reset transistor RX and the DCG transistor DCG. For example, the image sensor 100 may reset the FD node FD, the first capacitor $C_1$, and the second capacitor $C_2$ of the pixel PX by turning on the reset transistor RX and the DCG transistor DCG of the pixel PX. The image sensor 100 may turn off the reset transistor RX after the resetting of the FD node FD ends.

The pixel PX may output the pixel voltage VPIX corresponding to the LCG reset signal during the first period 310. The pixel PX may operate in the LCG mode since the DCG transistor DCG is in an ON state during the first period 310. Therefore, the pixel PX may output the pixel voltage VPIX corresponding to the LCG reset signal according to the LCG mode. For example, the pixel voltage VPIX corresponding to the LCG reset signal that is output by the pixel PX may be denoted by VPIX1.

The image sensor 100 may turn off the DCG transistor DCG at time t1 when the second period 320 starts. The capacitance of the FD node FD may be reduced as the DCG transistor DCG is turned off. As a result, the pixel PX may operate in the HCG mode during the second period 320.

The pixel PX may output the pixel voltage VPIX corresponding to the HCG reset signal during the second period 320. The pixel PX may operate in the HCG mode since the DCG transistor DCG is in the OFF state during the second period 320. Therefore, the pixel PX may output the pixel voltage VPIX corresponding to the HCG reset signal according to the HCG mode. For example, the pixel voltage VPIX corresponding to the HCG reset signal that is output by the pixel PX may be denoted by VPIX2.

Referring to FIG. 3, the pixel voltage VPIX may drop by $V_{drop}$ during a predetermined period starting from time t1. When the DCG transistor DCG included in the pixel PX changes from the ON state to the OFF state, coupling capacitance of the FD node FD may change. Thus, the voltage of the FD node FD may change accordingly. Therefore, when the DCG transistor DCG is turned off, the pixel voltage VPIX that is output from the pixel PX may also drop by $V_{drop}$. For example, VPIX2 may denote the pixel voltage VPIX that is lower than VPIX1 by $V_{drop}$.

The image sensor 100 may turn on the transmission transistor TX during a part of the third period 330 between time t2 and time t3. Charges that are generated by the photodiode PD when the transmission transistor of the pixel PX is in the ON state may be moved to the FD node FD.

The image sensor 100 may output the pixel voltage VPIX corresponding to the HCG reset signal during the third period 330. The pixel PX may operate in the HCG mode since the DCG transistor DCG remains turned off during the third period 330. In addition, the pixel PX may output the pixel voltage VPIX corresponding to the HCG image signal since the charges generated by the photodiode PD are moved to the FD node FD. For example, the pixel voltage VPIX corresponding to the HCG image signal that is output by the pixel PX may be denoted by VPIX3.

The image sensor 100 may turn on the DCG transistor DCG at time t3 when the fourth period 340 starts. The pixel PX may operate in the LCG mode since the DCG transistor DCG is turned on during the fourth period 340.

The image sensor 100 may turn on the transmission transistor TX again during a part of the fourth period 340. As the transmission transistor TX is turned on again, the charges that are generated by the photodiode PD and fail to move to the FD node FD during the third period 330 may be transferred to the FD node FD.

The image sensor 100 may output the pixel voltage VPIX corresponding to the LCG image signal during the fourth period 340. The pixel PX may operate in the LCG mode since the DCG transistor DCG is in the ON state during the fourth period 340. Therefore, the pixel PX may output the pixel voltage VPIX corresponding to the LCG image signal according to the LCG mode. For example, the pixel voltage VPIX corresponding to the LCG image signal which is output by the pixel PX may be denoted by VPIX4.

Hereinafter, a method of obtaining pixel values by converting the pixel voltage VPIX output by the pixel PX into a digital signal during a readout period of the pixel PX is described. The ADC may receive the pixel voltage VPIX from the pixel PX and may receive the ramp voltage RAMP from the ramp voltage generator 130. The ADC may obtain a pixel value based on a time at which the pixel voltage VPIX and the ramp voltage RAMP coincide with each other.

During the first period 310, the ramp voltage RAMP may have a phase that decreases with time from a first potential 301. The ADC may compare the pixel voltage VPIX1 corresponding to the LCG reset signal and the ramp voltage RAMP that decreases at a constant speed from the first potential 301. The ADC may obtain a pixel value (a digital signal) corresponding to the LCG reset signal based on a time at which the pixel voltage VIPX1 corresponding to the LCG reset signal coincides with the ramp voltage RAMP.

During the second period 320, the ADC may also obtain a pixel value indicating the HCG reset signal by comparing the pixel voltage VPIX with the ramp voltage RAMP and converting the pixel voltage VPIX into a digital signal. Referring to FIG. 3, the potential of the ramp voltage RAMP in the first period 310 may be different from that of the ramp voltage RAMP in the second period 320. During the second period 320, the ramp voltage RAMP may have a phase that decreases with time from a second potential 302 that is lower than the first potential 301 by a calibration value (x). The ramp voltage generator 130 may output the ramp voltage RAMP that drops by the calibration value (x) to compensate for the pixel voltage VPIX2 that drops by $V_{drop}$ during the second period 320. The ADC may compare the pixel voltage VPIX2 with the ramp voltage RAMP that decreases at a constant speed from the second potential 302. Based on a time at which the pixel voltage VIPX2 coincides with the ramp voltage RAMP, the ADC may obtain a pixel value (a digital signal) corresponding to the HCG reset signal. Although the pixel voltage VPIX1 and the pixel voltage VPIX2 have different values, since the ADC uses the ramp voltage RAMP that has different phases during the first period 310 and the second period 320, the pixel value corresponding to the LCG reset signal and the pixel value corresponding to the HCG reset signal may have corresponding values.

During the third period 330, the ramp voltage RAMP may have a phase that decreases with time from the second potential 302 that is lower than the first potential 301 by the calibration value (x). The ADC may compare the pixel voltage VPIX3 with the ramp voltage RAMP that decreases at a constant speed from the second potential 302. Based on a time at which the pixel voltage VIPX3 coincides with the ramp voltage RAMP, the ADC may obtain a pixel value (a digital signal) corresponding to the HCG image signal.

During the fourth period 340, the ramp voltage RAMP may have a phase that decreases with time from the first potential 301. The ADC may compare the pixel voltage VPIX4 with the ramp voltage RAMP that decreases at a constant speed from the first potential 301. Based on a time at which the pixel voltage VIPX4 coincides with the ramp voltage RAMP, the ADC may obtain a pixel value (a digital signal) corresponding to the LCG image signal.

The image sensor 100 may reduce the ramp voltage RAMP by the calibration value (x) so as to compensate for the drop of the pixel voltage VPIX by $V_{drop}$ caused by a change in conversion gain of the pixel PX. However, the value $V_{drop}$ by which the pixel voltage VPIX drops might not be a fixed value. For example, the value $V_{drop}$ may vary depending on a frame of an image to be captured, photographing environment, and/or the pixel PX. The image sensor 100 may include a feedback system for compensating for the varying value $V_{drop}$. The feedback system that is included in the image sensor 100 will be described below in detail with reference to FIG. 4.

According to the present disclosure, the image sensor 100 may be configured such that one ADC may perform analog-to-digital conversion (ADC) in both the LCG mode and the HCG mode by controlling the ramp voltage RAMP that is output by the ramp voltage generator 130. In a conventional image sensor, even if a pixel voltage is output by a single pixel PX, different ADCs may convert the pixel voltage into a digital signal. In other words, the conventional image sensor may include an LCG mode dedicated ADC and an HCG mode dedicated ADC. However, according to the present disclosure, the electronic device that includes the image sensor 100 may obtain an HDR image by using a DCG method. By controlling the ramp voltage RAMP, an HDR image with reduced noise, such as CFPN, may be obtained. In addition, according to the present disclosure, since the image sensor 100 includes an ADC that is operable in both LCG mode and HCG mode, a readout speed may be improved in comparison with the case in which separate ADCs are used for different driving modes, and power consumption of the ADCs may also be reduced.

As described above with reference to in FIG. 3, the ramp voltage RAMP may have a phase that decreases with time from a predetermined potential (e.g., the first potential 301 or the second potential 302). However, this is only an example. The ramp voltage RAMP may have a phase that increases with time from the predetermined potential. In addition, when the ramp voltage RAMP increases or decreases with time, it may mean that the ramp voltage RAMP increases or decreases linearly or that the ramp voltage RAMP has an inclination or a slope that remains constant.

Figure 4:
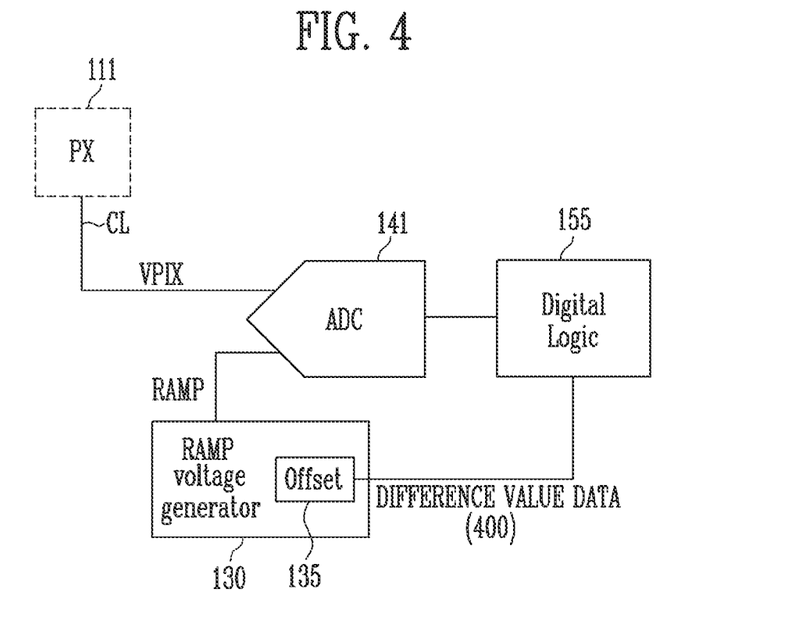
FIG. 4 is a diagram illustrating the configuration of an image sensor for controlling a ramp voltage according to an embodiment of the present disclosure.

FIG. 4 is a diagram illustrating the configuration of the image sensor 100 for controlling a ramp voltage according to an embodiment of the present disclosure. The first pixel 111 may indicate one of the pixels PX of FIG. 1. The first ADC 141 may indicate one of the ADCs included in the ADC block 140 as shown in FIG. 1. The description of the first pixel 111 and the first ADC 141 may also be applicable to other pixels PX and other ADCs as shown in FIG. 1.

As described above with reference to FIG. 3, the value by which the pixel voltage VPIX changes according to the driving mode of the pixel PX might not be a fixed value. In the second mode (HCG mode), the image sensor 100 may use the ramp voltage RAMP that constantly decreases from a potential (e.g., the second potential 302) that is lower than that in the first mode (LCG mode) by the calibration value (x). For example, the image sensor 100 may previously store a default calibration value that is calculated based on a simulation result at a design stage. In addition, the image sensor 100 may adjust the calibration value (x) in a manner as described with reference to FIG. 4 during the driving operation of the image sensor 100. A method of adjusting the calibration value (x) by the feedback system (e.g., the feedback loop) that is included in the image sensor 100 will be described with reference to FIG. 4.

The first pixel 111 may output the pixel voltage VPIX through the column line CL. For example, the first pixel 111 may output the pixel voltage VPIX corresponding to an LCG reset signal (VPIX1), the pixel voltage VPIX corresponding to an HCG reset signal (VPIX2), the pixel voltage VPIX corresponding to an HCG image signal (VPIX3), and the pixel voltage VPIX corresponding to an LCG image signal (VPIX4). The pixel voltage VPIX that is output by the first pixel 111 may be an analog signal.

The first ADC 141 may receive the pixel voltage VPIX from the first pixel 111 and may receive the ramp voltage RAMP from the ramp voltage generator 130. The first ADC 141 may output a pixel value that is converted into a digital signal based on a comparison result between the pixel voltage VPIX and the ramp voltage RAMP. For example, the first ADC 141 may output a pixel value corresponding to an LCG reset signal, a pixel value corresponding to an HCG reset signal, a pixel value corresponding to an HCG image signal, and a pixel value corresponding to an LCG image signal. The pixel value that is output by the first ADC 141 may be a digital signal.

The digital logic 155 may receive some of the pixel values that are output by the first ADC 141. For example, the digital logic 155 may receive the pixel value corresponding to the LCG reset signal and the pixel value corresponding to the HCG reset signal, among the pixel values that are output by the first ADC 141. As described with reference to FIG. 4, the pixel value corresponding to the LCG reset signal may be referred to as a first pixel value, and the pixel value corresponding to the HCG reset signal may be referred to as a second pixel value.

The digital logic 155 may calculate a difference between the first pixel value and the second pixel value that are received from the first ADC 141. The digital logic 155 may obtain difference value data 400 associated with the difference between the first pixel value corresponding to the LCG reset signal and the second pixel value corresponding to the HCG reset signal. For example, the digital logic 155 may obtain the difference value between the first pixel value and the second pixel value. The digital logic 155 may obtain a difference value between the pixel value corresponding to the LCG reset signal and the pixel value corresponding to the HCG reset signal that are received through at least one of the pixels PX that are included in the pixel array 110 as well as the first pixel 111. The digital logic 155 may integrate the difference value (e.g., the first pixel value and the second pixel value) corresponding to the reset signal. In the present disclosure, the difference value data 400 may indicate any one value from among a difference value that is obtained from one frame through one pixel, a value of a sum (or an integral value) of difference values obtained from one frame through a plurality of pixels, and a value of a sum (or an integral value) of difference values obtained from a plurality of frames through the plurality of pixels. In addition, the difference value data 400 may refer to various types of data that are obtained based on the difference value between the pixel value corresponding to the LCG reset signal and the pixel value corresponding to the HCG reset signal. FIG. 4 shows that the digital logic 155 obtains the difference value data 400 based on the first pixel value and the second pixel value that the digital logic 155 receives from the first ADC 141. However, the digital logic 155 may acquire the difference value data 400 by using the pixel values that are received from at least two ADCs in addition to the first ADC 141.

The digital logic 155 may provide the ramp voltage generator 130 with the difference value data 400 associated with the difference between the pixel value corresponding to the LCG reset signal and the pixel value corresponding to the HCG reset signal.

The ramp voltage generator 130 may control the ramp voltage RAMP based on the difference value data 400. The ramp voltage generator 130 may control the calibration value (x) based on the difference value data 400. For example, an offset block 135 that is included in the ramp voltage generator 130 may control the ramp voltages RAMP, which are output in the LCG mode and the HCG mode, to have different potentials. The difference between the potentials may be as much as the calibration value (x). The ramp voltage generator 130 may adjust (e.g., maintain or change) the calibration value (x) by using the offset block 135 such that a waveform of the ramp voltage RAMP may correspond to a level variation (e.g., $V_{drop}$) of the pixel voltage VPIX.

The ramp voltage generator 130 may maintain the calibration value (x) in response to the difference value data 400 being less than a threshold value. For example, when the first pixel value corresponding to the LCG reset signal and the second pixel value corresponding to the HCG reset signal coincide with each other or a difference between the first and second pixel values is too small to ignore, the current calibration value (x) may be large enough to be provided to the first ADC 141. Therefore, the ramp voltage generator 130 may maintain the calibration value (x).

The ramp voltage generator 130 may change the calibration value (x) in response to the difference value data 400 being greater than or equal to the threshold value. For example, when there is a predetermined level or more of difference between the first pixel value corresponding to the LCG reset signal and the second pixel value corresponding to the HCG reset signal, it may mean that the calibration of the ramp voltage RAMP might not be appropriately performed. The ramp voltage generator 130 may control the calibration value (x) to reduce the difference between the first pixel value and the second pixel value.

After the ramp voltage generator 130 maintains or changes the ramp voltage RAMP based on the difference value data 400, the ramp voltage generator 130 may output the controlled ramp voltage RAMP. The first ADC 141 may receive the controlled ramp voltage RAMP from the ramp voltage generator 130. For example, the first ADC 141 may obtain a pixel value by comparing the controlled ramp voltage RAMP with the pixel voltage VPIX received from the first pixel 111 or another pixel in the corresponding column. Though not shown, the second ADC corresponding to the second column of the pixel array 110 may obtain the pixel voltage VPIX received from the pixel of the second column and the controlled ramp voltage RAMP.

For convenience of explanation, the feedback system is described above with reference to FIG. 4, based on the first pixel 111 and the first ADC 141. However, the present disclosure is not limited thereto. For example, the image sensor 100 may control the ramp voltage RAMP by using at least some of the pixels PX included in the pixel array 110. The image sensor 100 may designate at least one pixel PX as a representative pixel and may adjust the ramp voltage RAMP based on a difference between a first pixel value and a second pixel value that are obtained through the representative pixel. The representative pixel may be one of one pixel at a predetermined location, pixels in a predetermined row, or pixels in a region of interest (ROI). The image sensor 100 may obtain pixel values of all pixels PX by using the calibration value (x) determined through the representative pixel.

The image sensor 100 may continuously calibrate the ramp voltage RAMP by using the feedback system in FIG. 4. The image sensor 100 may perform real-time calculation of difference value data by using the digital logic 155. The ramp voltage generator 130 may adjust the calibration value (x) in real time by using the difference value data. In the present disclosure, the term 'real time' may cover a case in which predetermined operations are performed with a constant time delay during the driving of the image sensor 100. The feedback system of FIG. 4 may be referred to as automatic calibration. The image sensor 100 may operate the feedback system as described in FIG. 4 without any separate external control (e.g., user input). In addition, since the feedback system of FIG. 4 uses the difference value data as a factor for changing the calibration value (x) of the ramp voltage generator 130, the feedback system may be referred to as a negative feedback, a negative loop, or negative feedback calibration.

Through the feedback system as shown in FIG. 4, the first ADC 141 may operate in both the LCG mode and the HCG mode of the first pixel 111. For example, in the image sensor 100, one ADC may be coupled to every single pixel column of the pixel array 110, and the one ADC may operate both in the first mode (LCG mode) and the second mode (HCG mode). According to the present disclosure, a speed at which the image sensor 100 reads out the first pixel 111 may be increased when compared with the conventional image sensor that uses different ADCs in the LCG mode and the HCG mode of a pixel. The improved readout speed will be described in more detail with reference to FIGS. 5 and 7.

Figure 5:
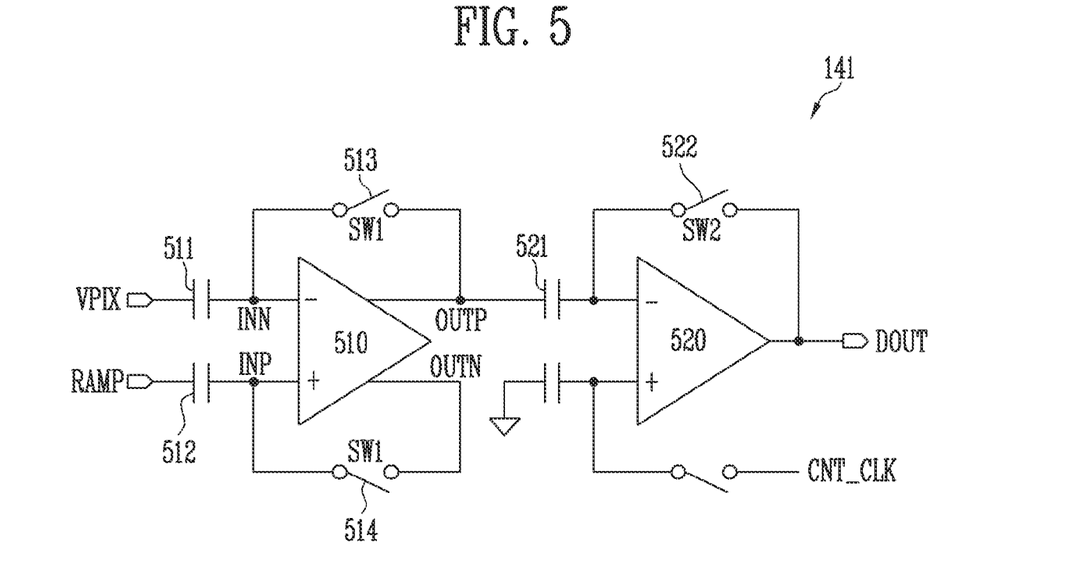
FIG. 5 is a diagram illustrating the configuration of an analog-to-digital converter (ADC) which is operable in both a first mode and a second mode according to an embodiment of the present disclosure.

FIG. 5 is a diagram illustrating the configuration of an analog-to-digital converter (ADC) that is operable in both a first mode and a second mode according to an embodiment of the present disclosure. The first ADC 141 of FIG. 5 may be one of the ADCs, shown in FIG. 1. The description about the first ADC 141 may be applicable to other ADCs, shown in FIG. 1.

Referring to FIG. 5, the first ADC 141 may include a comparator 510 and a counter 520. The comparator 510 may compare a level of the pixel voltage VPIX that is input to an input node INN through a capacitor 511 with a level of the ramp voltage RAMP that input to an input node INP through a capacitor 512. The comparator 510 may output a comparison signal corresponding to the comparison result to an output node OUTP. The comparison signal may refer to a signal, the level of which transitions at a time when the pixel voltage VPIX and the ramp voltage RAMP coincide with each other. The counter 520 may receive the comparison signal from the comparator 510 through a capacitor 521 and may receive a counting clock CNT_CLK from a counting clock generator. The counter 520 may obtain a pixel value DOUT by counting from a time at which the ramp voltage RAMP decreases/increase to a time at which a level of the comparison signal transitions by using the counting clock CNT_CLK.

The image sensor 100 may carry out auto-zeroing before a comparison operation of the comparator 510 is performed. The image sensor 100 may auto-zero the comparator 510 through a switch signal SW1 which is provided to switches 513 and 514 of the comparator 510. The image sensor 100 may electrically couple the input node INN and the output node OUTP by turning on the switch 513 and may electrically couple the input node INP and an output node OUTN by turning on the switch 514. The image sensor 100 may cause the pixel voltage VPIX and the comparison signal to have the same level by auto-zeroing the comparator 510, thereby cancelling reset noise of the pixel voltage VPIX or offset of the comparator 510.

In addition, the image sensor 100 may auto-zero the counter 520 by a switch signal SW2 that is provided to a switch 522 of the comparator 520. The image sensor 100 may electrically couple an input node and an output node of the counter 520 by turning on the switch 522. The image sensor 100 may cause the comparison signal and the pixel value DOUT to have the same level by auto-zeroing the counter 520, thereby cancelling offset of the comparator 510.

The switch signals SW1 and SW2 that are provided to the switches 513, 514, and 522 included in the first ADC 141 will be described below with reference to FIG. 7.

According to the present disclosure, the image sensor 100 may control the potential of the ramp voltage RAMP that is provided to the first ADC 141 so that the pixel value in the first mode (LCG mode) of the first pixel 111 and the pixel value in the second mode (HCG mode) thereof may be the same. Therefore, the first ADC 141 may carry out one-time auto-zeroing for each one readout period without separately auto-zeroing in each driving mode of the first pixel 111.

The conventional image sensor may have to perform auto-zeroing twice during a readout period (e.g., a readout period included in one frame period) of a pixel. For example, an image sensor that uses separate ADCs according to driving modes of a pixel may require auto-zeroing of an ADC used in an LCG mode and auto-zeroing of an ADC used in an HCG mode. However, according to the present disclosure, the image sensor 100 may perform only one-time auto-zeroing during the readout period of the pixel PX (e.g., the readout period of FIG. 3). Therefore, according to the present disclosure, the readout speed of the pixel PX may be improved.

Figure 6:
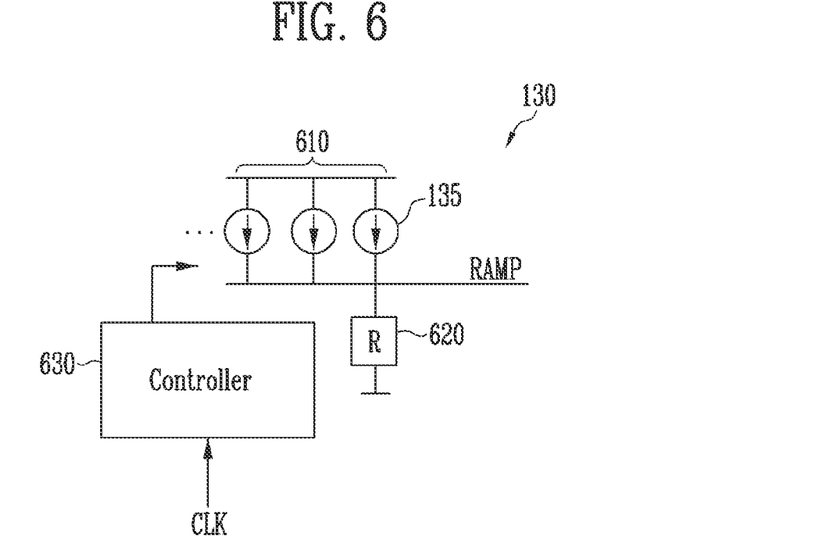
FIG. 6 is a diagram illustrating the configuration of a ramp voltage generator adjusting a calibration value of a ramp voltage according to an embodiment of the present disclosure.

FIG. 6 is a diagram illustrating the configuration of the ramp voltage generator 130 controlling a calibration value of a ramp voltage according to an embodiment of the present disclosure.

Referring to FIG. 6, the ramp voltage generator 130 may include a current digital-to-analog converter (IDAC) array 610, a variable resistor 620, and a controller 630.

The ramp voltage generator 130 may generate the ramp voltage RAMP that has a predetermined waveform by using the IDAC array 610 and the variable resistor 620. The controller 630 may determine the waveform of the ramp voltage RAMP based on a clock signal CLK that is input. For example, the controller 630 may control the ramp voltage RAMP to have the first potential 301 or the second potential 302 by applying an offset to the ramp voltage RAMP at a time that is designated based on the clock signal CLK. In addition, the controller 630 may control the ramp voltage RAMP to increase or decrease with time from the designated time based on the clock signal CLK.

The IDAC array 610 may include an offset block 135. The offset block 135 may control the calibration value (x) of the ramp voltage RAMP based on the difference value data 400 that is received from the digital logic 155. The ramp voltage generator 130 may output the ramp voltage RAMP that decreases constantly from the first potential 301 in the first mode (LCG mode) and may output the ramp voltage RAMP that decreases constantly from the second potential that is lower than the first potential 301 by the adjusted calibration value (x) in the second mode. The ramp voltage RAMP that decreases constantly from the second potential 302 that is lower the first potential 301 by the adjusted calibration value (x) may be referred to as the controlled ramp voltage RAMP.

Figure 7:
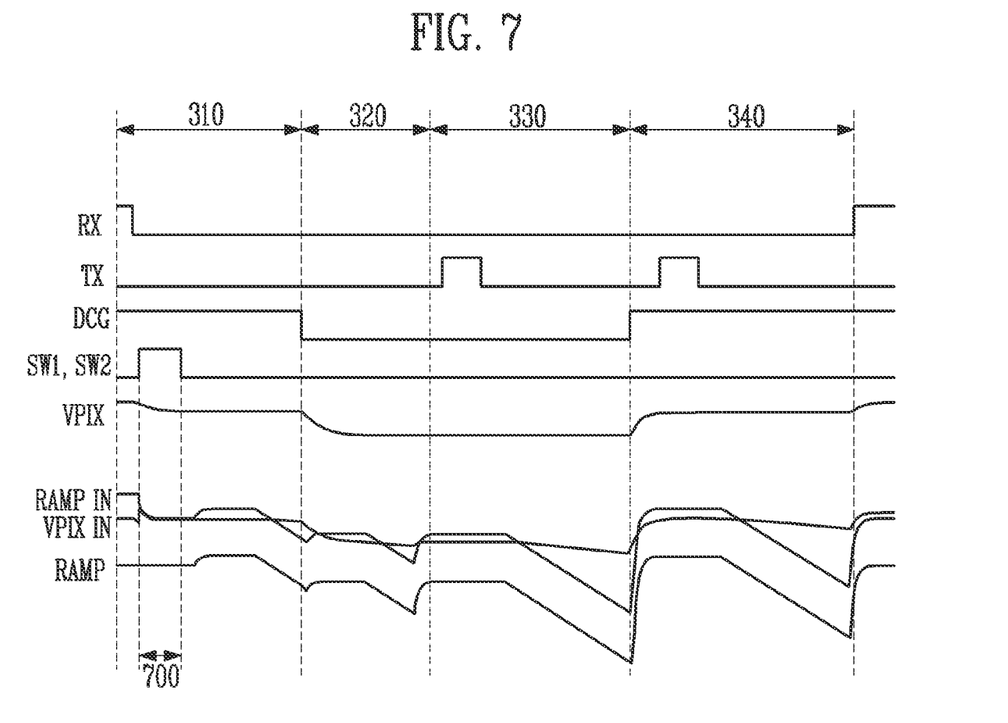
FIG. 7 is a timing diagram illustrating an ADC obtaining a pixel value in each of a first mode and a second mode by one-time auto-zero according to an embodiment of the present disclosure.

FIG. 7 is a timing diagram illustrating an ADC acquiring a pixel value in each of a first mode and a second mode by one-time auto-zeroing according to an embodiment of the present disclosure. FIG. 7 may be substantially the same timing diagram as FIG. 3.

The first period 310, the second period 320, the third time 330, and the fourth period 340 as shown in FIG. 7 may correspond to the first period 310, the second period 320, the third time 330, and the fourth period 340, respectively, as described with above with reference to FIG. 3. Reference characters RX, TX, DCG, VPIX, and RAMP as shown in FIG. 7 may correspond to the reference characters RX, TX, DCG, VPIX, and RAMP, respectively, as shown in FIG. 3. The components as described above with reference to FIG. 3 may be described in brief or not at all when describing FIG. 7.

Reference characters SW1 and SW2 as shown in FIG. 7 may indicate ON/OFF of the switch signals SW1 and SW2 described with reference to FIG. 5. Reference characters VPIX IN as shown in FIG. 7 may indicate a voltage level of the input node INN of the comparator 510 of FIG. 5. In addition, reference characters RAMP IN may indicate a voltage level of the input node INP of the comparator 510 of FIG. 5.

The image sensor 100 may turn on the switch signals SW1 and SW2 by resetting the FD node FD of the pixel PX in the first period 310. A period in which the switch signals SW1 and SW2 are in the ON state may be referred to as an auto-zero period 700.

The image sensor 100 may perform auto-zeroing of the ADCs during the auto-zero period 700. For example, the image sensor 100 may auto-zero the comparator 510 and the counter 520 during the auto-zero period 700. During the auto-zero period 700, the image sensor 100 may electrically couple the input node INN of the comparator 510 with the output node OUTP of the comparator 510 by turning on the switch 513. In addition, during the auto-zero period 700, the image sensor 100 may electrically couple the input node INP of the comparator 510 with the output node OUTN of the comparator 510 by turning on the switch 514.

Referring to FIG. 7, as the switches 513 and 514 are turned on by the switch signal SW1 during the auto-zero period 700, the pixel voltage VPIX IN that is input to the comparator 510 and the ramp voltage RAMP that is input to the comparator 510 may have the same level.

According to the present disclosure, the image sensor 100 may perform one-time auto-zeroing during the readout period. After performing the auto-zeroing during the auto-zero period 700, the image sensor 100 may read out the LCG reset signal, the HCG reset signal, the HCG image signal, and the LCG image signal while the switch signals SW1 and SW2 remain turned off. In other words, the image sensor 100 may maintain the switches 513, 514, and 522 in the OFF state during the readout period, except for the readout period of the pixel PX.

As shown in FIG. 7, according to the present disclosure, since the image sensor 100 performs one-time auto-zeroing during the readout period of the pixel PX, the readout period of the pixel PX may be improved compared to the conventional image sensor.

Figure 8:
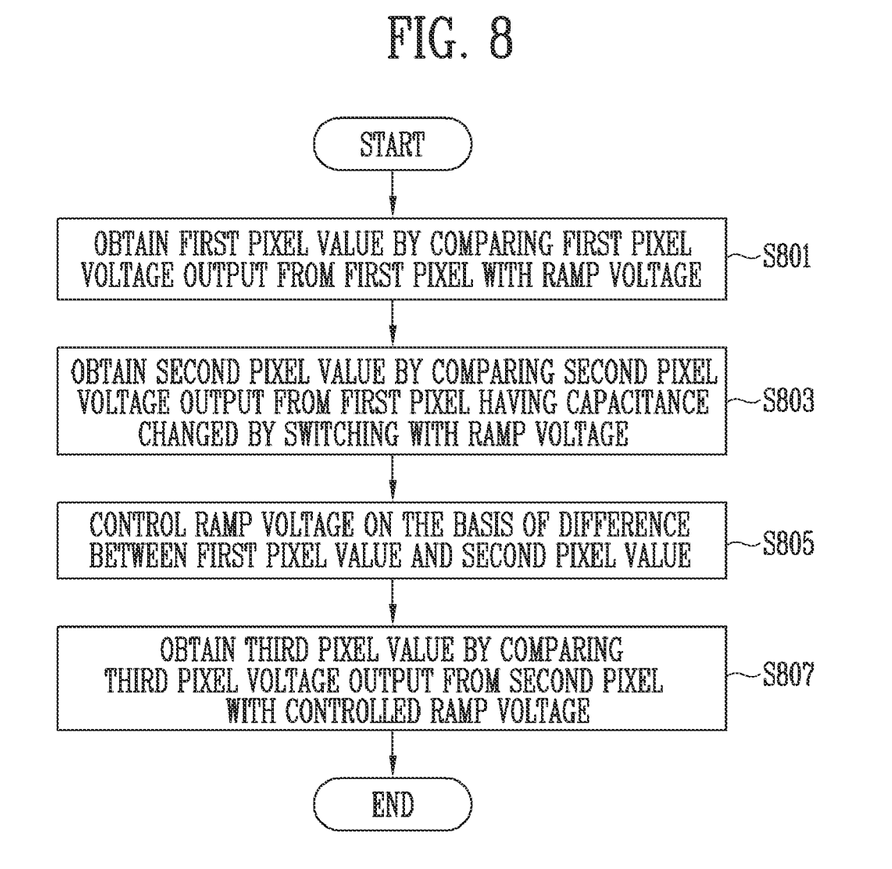
FIG. 8 is a flowchart illustrating operations of an image sensor according to an embodiment of the present disclosure.

FIG. 8 is a flowchart illustrating operations of the image sensor 100 according to an embodiment of the present disclosure.

At step S801, the image sensor 100 may obtain a first pixel value by comparing the ramp voltage RAMP with a first pixel voltage that is output from the first pixel 111. The first pixel voltage may refer to the pixel voltage VPIX corresponding to the LCG reset signal. The first pixel value may refer to a pixel value corresponding to the LCG reset signal.

The image sensor 100 may obtain the first pixel value by comparing the first pixel voltage with the ramp voltage RAMP that decreases with time from the first potential 301 that is set beforehand.

At step S803, the image sensor 100 may obtain a second pixel value by comparing the ramp voltage RAMP with a second pixel voltage that is output from the first pixel 111 having a capacitance changed by switching. The second pixel voltage may indicate the pixel voltage VPIX corresponding to the HCG reset signal. The second pixel value may indicate a pixel value corresponding to the HCG reset signal.

At step S803, switching may indicate that the conversion gain of the pixel PX and the driving mode thereof are changed depending on ON/OFF of the DCG transistor DCG included in the pixel PX. For example, the image sensor 100 may reduce the capacitance of the FD node FD of the first pixel 111 by turning off the DCG transistor DCG included in the first pixel 111. Therefore, the image sensor 100 may change a first conversion gain (e.g., LCG) of the first pixel 111 into a second conversion gain (e.g., HCG) that is greater than the first conversion gain.

The image sensor 100 may obtain the second pixel value by comparing the second pixel voltage with the ramp voltage RAMP that decreases with time from the second potential 302 that is lower than the first potential 301 by the calibration value (x).

At step S805, the image sensor 100 may control the ramp voltage RAMP based on the difference between the first pixel value and the second pixel value. For example, the image sensor 100 may obtain the difference value data 400 associated with the difference between the first pixel value corresponding to the LCG reset signal and the second pixel value corresponding to the HCG reset signal. The ramp voltage generator 130 may control the ramp voltage RAMP to reduce the difference value data 400.

At step S807, the image sensor 100 may obtain a third pixel value by comparing the controlled ramp voltage RAMP with a third pixel voltage that is output from the second pixel. The ramp voltage generator 130 may output the ramp voltage RAMP with the adjusted calibration value (x). The image sensor 100 may perform analog-digital conversion by using the controlled ramp voltage RAMP.

At step S807, the second pixel may be an arbitrary pixel that is included in the same column as the first pixel 111 or an arbitrary pixel that is included in another column different from the first pixel 111. The third pixel voltage may refer to a pixel voltage that is output by the second pixel. For example, the third pixel voltage may be a pixel voltage corresponding to an LCG reset signal, a pixel voltage corresponding to an HCG reset signal, a pixel voltage corresponding to an HCG image signal, and a pixel voltage corresponding to an LCG image signal. The third pixel value may refer to a pixel value by converting a pixel voltage which is output by the second pixel into a digital signal. For example, the third pixel value may be a pixel value corresponding to an LCG reset signal, a pixel value corresponding to an HCG reset signal, a pixel value corresponding to an HCG image signal, and a pixel value corresponding to an LCG image signal.

Figure 9:
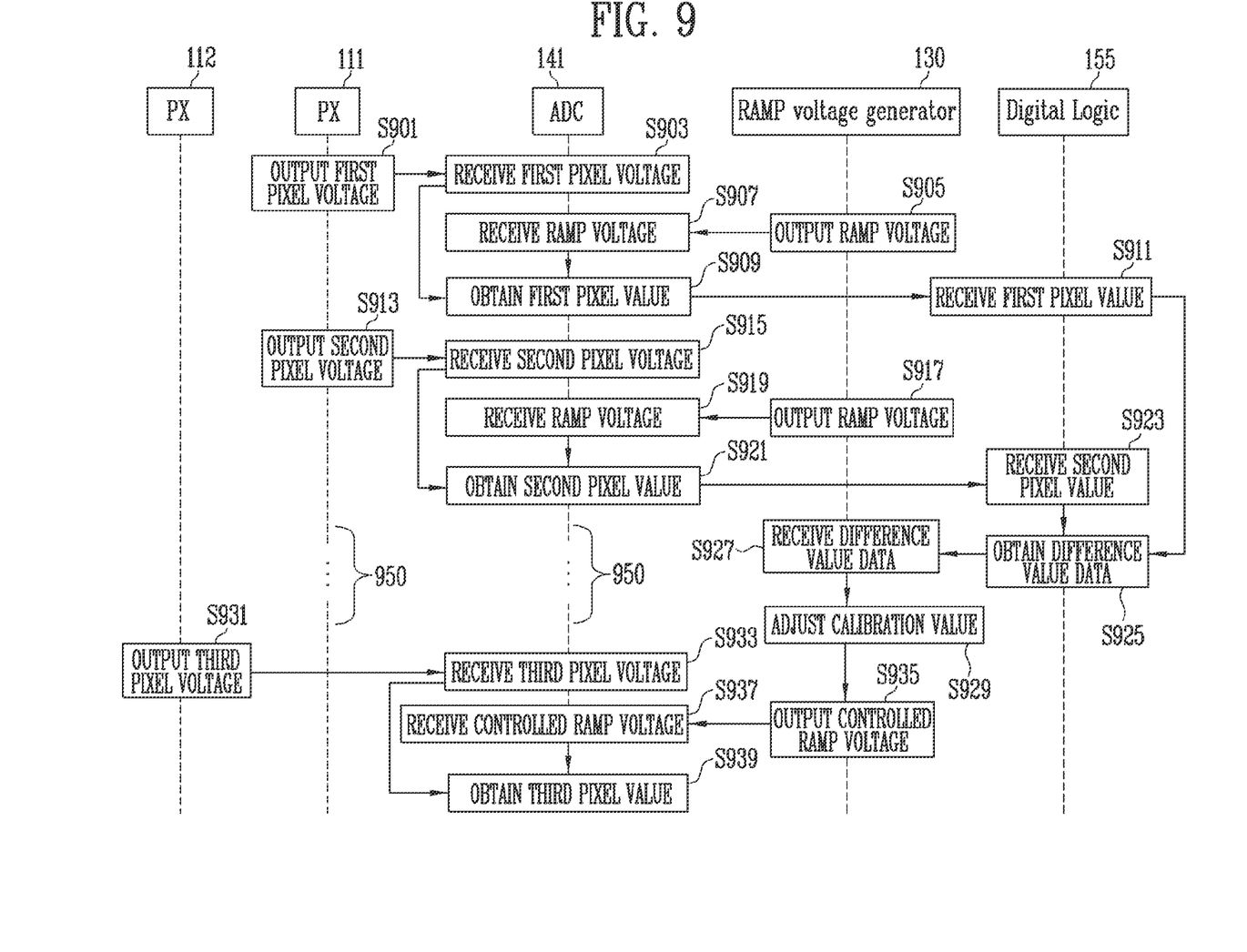
FIG. 9 is a flowchart illustrating operations of pixels, an ADC, a ramp voltage generator, and digital logic according to an embodiment of the present disclosure.

FIG. 9 is a flowchart illustrating operations of pixels, an ADC, a ramp voltage generator, and digital logic according to an embodiment of the present disclosure.

At step S901, the first pixel 111 may output a first pixel voltage. The first pixel voltage may correspond to a reset signal that is output when the first pixel 111 is driven in a first mode (LCG mode). At step S903, the first ADC 141 may receive the first pixel voltage from the first pixel 111.

At step S905, the ramp voltage generator 130 may output the ramp voltage RAMP. At step S907, the first ADC 141 may receive the ramp voltage RAMP.

At step S909, the first ADC 141 may obtain a first pixel value by comparing the first pixel voltage with the ramp voltage RAMP. The first pixel value may indicate a pixel value corresponding to the LCG reset signal. At step S911, the digital logic 155 may receive the first pixel value.

At step S913, the first pixel 111 may output a second pixel voltage. The second pixel voltage may correspond to a reset signal that is output when the first pixel 111 is driven in a second mode (HCG mode). At step S915, the first ADC 141 may receive the second pixel voltage from the first pixel 111.

At step S917, the ramp voltage generator 130 may output the ramp voltage RAMP. At step S919, the first ADC 141 may receive the ramp voltage RAMP.

At step S921, the first ADC 141 may obtain a second pixel value by comparing the second pixel voltage with the ramp voltage RAMP. The second pixel value may indicate a pixel value corresponding to the HCG reset signal. At step S923, the digital logic 155 may receive the second pixel value.

At step S925, the digital logic 155 may obtain the difference value data 400 based on the first pixel value and the second pixel value. For example, the digital logic 155 may calculate the difference value between the first pixel value and the second pixel value.

At step S927, the ramp voltage generator 130 may receive the difference value data 400. At step S929, the ramp voltage generator 130 may control the calibration value (x) based on the difference value data 400. For example, the ramp voltage generator 130 may change the calibration value (x) when the difference value data 400 is greater than or equal to a threshold value.

At step S931, a second pixel 112 may output a third pixel voltage. The third pixel voltage may refer to an arbitrary pixel voltage that is output by the second pixel 112. At step S933, the first ADC 141 may receive the third pixel voltage from the second pixel 112. As described above with reference to FIG. 9, the first ADC 141 may receive the third pixel voltage from the second pixel 112 on the assumption that the second pixel 112 is arranged on the same column as the first pixel 111. However, this is merely an example. The present disclosure is also applicable to the case in which the second pixel 112 is arranged in a different column from that of the first pixel 111.

At step S935, the ramp voltage generator 130 may output the controlled ramp voltage RAMP. At step S937, the first ADC 141 may receive the controlled ramp voltage RAMP.

At step S939, the first ADC 141 may obtain a third pixel value by comparing the third pixel voltage with the controlled ramp voltage RAMP. The third pixel value may indicate a value by converting the third pixel voltage into a digital signal. After step S939, processes corresponding to steps S9111 to S929 may be performed.

For convenience of explanation, FIG. 9 mainly shows the first pixel voltage corresponding to the LCG reset signal that is output by the first pixel 111 and the second pixel voltage corresponding to the HCG reset signal that is output by the first pixel 111. The processes that are performed during the period corresponding to reference numerals 950 may be understood as being omitted from FIG. 9. For example, during the period corresponding to reference numerals 950, the first pixel 111 may output a pixel voltage corresponding to the HCG image signal and a pixel voltage corresponding to the LCG image signal, and the first ADC 141 may obtain a pixel value corresponding to the HCG image signal and a pixel value corresponding to the LCG image signal and provide these pixel values to the column readout circuit 150.

Accordingly, an electronic device may obtain an HDR image with corrected noise, such as CFPN, through an image sensor according to the present disclosure even when a level of a pixel voltage is changed. In addition, the image sensor according to the present disclosure includes an ADC that is operable in both an LCG mode and an HCG mode so that time and power resources required to read out a pixel array may be reduced.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. An image sensor, comprising:
a pixel including a floating diffusion (FD) node having a first capacitance in a first mode and a second capacitance that is less than the first capacitance in a second mode;
an analog-to-digital converter (ADC) outputting a pixel value based on a ramp voltage and a pixel voltage output from the pixel; and
a ramp voltage generator controlling the ramp voltage based on a difference between a first pixel value output from the ADC in the first mode and a second pixel value output from the ADC in the second mode.

2. The image sensor of claim 1, further comprising digital logic receiving the first pixel value and the second pixel value from the ADC and providing difference value data associated with the difference between the first pixel value and the second pixel value to the ramp voltage generator.

3. The image sensor of claim 2, wherein the ramp voltage generator: outputs the ramp voltage decreasing with time from a first potential set beforehand in the first mode,
outputs the ramp voltage decreasing with time from a second potential that is lower than the first potential by a calibration value in the second mode, and
adjusts the calibration value based on the difference value data received from the digital logic.

4. The image sensor of claim 3, wherein the ramp voltage generator:
maintains the calibration value in response to the difference value data being less than a threshold value, and
changes the calibration value in response to the difference value data being greater than or equal to the threshold value.

5. The image sensor of claim 1, wherein the ADC:
outputs the first pixel value and the second pixel value based on the ramp voltage and a pixel voltage output from a first pixel, and
outputs a third pixel value based on a controlled ramp voltage and a pixel voltage output from the second pixel.

6. The image sensor of claim 1, wherein the pixel further comprises a dual conversion gain (DCG) transistor controlling a capacitance of the FD node.

7. The image sensor of claim 6, further comprising a row driver determining one of the first mode and the second mode as a driving mode of the pixel by using ON/OFF of the DCG transistor.

8. The image sensor of claim 1, wherein the pixel:
outputs a first pixel voltage according to a first conversion gain in the first mode, and
outputs a second pixel voltage according to a second conversion gain that is greater than the first conversion gain in the second mode.

9. The image sensor of claim 8, wherein the ADC is coupled to each one pixel column including the pixel, and
wherein the ADC outputs the first pixel value by comparing the first pixel voltage with the ramp voltage in the first mode and outputs the second pixel value by comparing the second pixel voltage with the ramp voltage in the second mode.

10. The image sensor of claim 8, wherein the ADC:
performs auto-zeroing to electrically couple an input node and an output node of a comparator by turning on a switch of the comparator included in the ADC, and
outputs the first pixel value based on the first pixel voltage and the second pixel value based on the second pixel voltage when the switch is maintained in an OFF state.

11. A method of operating an image sensor, the method comprising:
obtaining a first pixel value by comparing a first pixel voltage output from a first pixel with a ramp voltage;
obtaining a second pixel value by comparing the ramp voltage with a second pixel voltage output from the first pixel having a conversion gain changed by switching;
controlling the ramp voltage based on a difference between the first pixel value and the second pixel value; and
obtaining a third pixel value by comparing a third pixel voltage output from a second pixel with a controlled ramp voltage.

12. The method of claim 11, wherein the obtaining of the first pixel value comprises comparing the first pixel voltage with the ramp voltage decreasing with time from a first potential set beforehand.

13. The method of claim 12, wherein the obtaining of the second pixel value comprises comparing the second pixel voltage with the ramp voltage decreasing with time from a second potential that is less than the first potential by a calibration value.

14. The method of claim 13, wherein the controlling of the ramp voltage comprises adjusting the calibration value based on a difference between the first pixel value and the second pixel value.

15. The method of claim 11, wherein the obtaining of the second pixel value comprises changing a first conversion gain of the first pixel into a second conversion gain that is greater than the first conversion gain by controlling a switch included in the first pixel.

16. The method of claim 11, further comprising performing auto-zeroing by turning on a switch of a comparator included in an ADC.

17. The method of claim 16, wherein the performing of the auto-zeroing comprises electrically coupling an input node and an output node of the comparator.

18. The method of claim 16, wherein the obtaining of the first pixel value and the second pixel value comprises obtaining the first pixel value based on the first pixel voltage and obtaining the second pixel value based on the second pixel voltage through the ADC when the switch is maintained in an OFF state.

* * * * *